(12) United States Patent
Zoryn et al.

(10) Patent No.: US 9,940,365 B2
(45) Date of Patent: Apr. 10, 2018

(54) RANKING TABLES FOR KEYWORD SEARCH

(71) Applicant: Microsoft Corporation, Redmond, WA (US)

(72) Inventors: Kanstantsyn Zoryn, Redmond, WA (US); Zhimin Chen, Redmond, WA (US); Kaushik Chakrabarti, Redmond, WA (US); James P. Finnigan, Redmond, WA (US); Vivek R. Narasayya, Redmond, WA (US); Surajit Chaudhuri, Redmond, WA (US); Kris Ganjam, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 236 days.

(21) Appl. No.: 14/325,378

(22) Filed: Jul. 8, 2014

(65) Prior Publication Data

US 2016/0012052 A1  Jan. 14, 2016

(51) Int. Cl.
*G06F 17/30* (2006.01)

(52) U.S. Cl.
CPC .... *G06F 17/3053* (2013.01); *G06F 17/30864* (2013.01)

(58) Field of Classification Search
CPC ......... G06F 17/30106; G06F 17/30675; G06F 17/30637
See application file for complete search history.

(56) References Cited

U.S. PATENT DOCUMENTS

| | | | |
|---|---|---|---|
| 7,970,768 B2* | 6/2011 | Anderson | G06F 17/30038 707/741 |
| 7,987,189 B2* | 7/2011 | Anderson | G06F 17/30038 707/741 |
| 8,326,842 B2 | 12/2012 | Vadlamani et al. | |

(Continued)

OTHER PUBLICATIONS

Daniel Santos and Daniele Tiles, Check Numeric values in alphanumeric variables, Apr. 15, 2009, SAS.com (blog available at https://communities.sas.com/t5/SAS-Procedures/Check-numeric-values-in-alphanumeric-variables/td-p/19247#).*

(Continued)

*Primary Examiner* — Robert Beausoliel, Jr.
*Assistant Examiner* — Hau H Hoang
(74) *Attorney, Agent, or Firm* — Michael B. Dodd; Dodd Law Group

(57) ABSTRACT

The present invention extends to methods, systems, and computer program products for ranking tables for keyword search. Aspects of the invention include generating lists of candidate tables for inclusion in a search query response, computing table hit matrices, retrieving content from fields of candidate tables having keyword hits, generating ranking features of tables, and computing ranking scores for tables. Aspects of the invention can be used to match keywords against column names, to match keywords against values in subject and non-subject columns, and to match keywords against table descriptions like page titles, table captions, cell values, nearest headings and surrounding text. Which keywords are matched against which fields can depend on the table and/or the query (referred to as "late binding").

38 Claims, 12 Drawing Sheets

(56) References Cited

U.S. PATENT DOCUMENTS

| | | | | |
|---|---|---|---|---|
| 8,396,883 | B2* | 3/2013 | Liu | G06F 17/30389 707/723 |
| 8,468,163 | B2* | 6/2013 | Gupta | G06F 17/30734 707/758 |
| 8,862,458 | B2* | 10/2014 | Freising | G06F 17/2785 704/9 |
| 9,111,012 | B2* | 8/2015 | Fu | G06F 17/30575 |
| 9,317,563 | B1* | 4/2016 | Horling | G06F 17/3053 |
| 2003/0088715 | A1 | 5/2003 | Chaudhuri et al. | |
| 2003/0115192 | A1* | 6/2003 | Kil | G06F 17/30539 |
| 2006/0074881 | A1 | 4/2006 | Vembu et al. | |
| 2011/0270815 | A1 | 11/2011 | Li | |
| 2012/0011115 | A1 | 1/2012 | Madhavan et al. | |
| 2012/0179540 | A1* | 7/2012 | Michaels | G06Q 30/0251 705/14.49 |
| 2012/0323967 | A1* | 12/2012 | Ju | G06F 17/30011 707/780 |
| 2013/0054617 | A1* | 2/2013 | Colman | G06F 17/3089 707/748 |
| 2014/0089318 | A1* | 3/2014 | Liu | G06F 17/30997 707/741 |
| 2014/0317137 | A1* | 10/2014 | Hanaoka | G06F 17/30622 707/758 |

OTHER PUBLICATIONS

Answering Table Queries on the Web using Column Keywords written by Rakesh Pimplikar, Aug. 27, 2012, Proceedings of the VLDB Endowment,vol. 5, No. 10 Copyright 2012 VLDB Endowment 2150-8097/12/06.*

Anitha, et al., "Keyword Search in XML Database with Relevance Ranking and Maintaining Stored Websites", In Proceedings of International Journal of Science and Research, vol. 3 Issue 1, Jan. 2014, 5 pages.

Liu, et al., "TableSeer: Automatic Table Metadata Extraction and Searching in Digital Libraries", In Proceedings of the 7th ACM/IEEE-CS joint conference on Digital libraries, Jun. 17, 2007, 10 pages.

Pivk, et al., "Semantic Search in Tabular Structures", In Proceedings of Informatica Slovenia, vol. 30, No. 2, Jun. 1, 2006, 10 pages.

Nazir, et al., "Algorithms for Generating Ontology Based Visualization from Semantic Search Results", In 20th International Workshop on Database and Expert Systems Application, Aug. 31, 2009, 5 pages.

Venetis, et al., "Table Search Using Recovered Semantics", In Proceedings of the VLDB Endowment, Sep. 13, 2010, 11 pages.

Cafarella, et al., "WebTables: Exploring the Power of Tables on the Web", In Proceedings of the VLDB Endowment, vol. 1, Issue 1, Aug. 2008, 12 pages.

Venetis, et al., "Recovering Semantics of Tables on the Web", In Proceedings of the VLDB Endowment, vol. 4, Issue 9, Aug. 29, 2011, 11 pages.

Wang, et al., "Understanding Tables on the Web", In Proceedings of the 31st international conference on Conceptual Modeling, Oct. 15, 2012, 14 pages.

"Data Management", Published on: Jun. 26, 2012, Available at: http://research.google.com/pubs/DataManagement.html.

Burges, Christopher J.C., "From RankNet to LambdaRank to LambdaMART: An Overview", In Microsoft Research Technical Report MSR-TR-2010-82, Jun. 23, 2010.

* cited by examiner

RANKING TABLES FOR KEYWORD SEARCH

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

Search engines can be used on networks, including the Internet, to locate information of interest to a user. A search engine typically uses a crawler that continual crawls Web pages on a network, such as, the Internet, to index content. To find content, a user submits one or more search terms to the search engine. The search engine identifies pages deemed to contain content relevant to the one or more search terms. The search engine then returns links to the identified pages back to the user. The user can then select (e.g., "click") a link to view content of a corresponding page.

A structured data search system (SDSS) similarly crawls a network, such as the Internet, to index structured information. Structured information can include tables in a relational database or HTML tables extracted from Web pages. To find structured data, a user submits one or more search terms to the SDSS. The SDSS identifies structured data, such as, a table, deemed to contain content relevant to the one or more search terms. The search engine then returns the structured data back to the user. The user can then integrate the structured data into their applications.

Due to the diversity of content generation on the Internet, the definition and content of structured data as well as the integration of structured data into a Web page can vary widely between different Web pages. As such, it can be difficult to effectively index structured data, such as, tables. When structured data is not appropriately indexed, search results are less relevant.

Further, even when multiple portions of structured data (e.g., multiple tables) match search terms, there may be no way to determine an order in which to present the different portions. Determining an order becomes increasingly difficult as the number of identified portions increases. For example, hundreds or even thousands of tables can be returned as a match for entered search terms. Although some tables may be more relevant than other tables, it may be difficult to identify more relevant tables and present the more relevant tables prior to less relevant tables.

BRIEF SUMMARY

The present invention extends to methods, systems, and computer program products for ranking tables for keyword search. Aspects of the invention include generating lists of candidate tables for inclusion in a search query response, computing table hit matrices, retrieving content from fields of candidate tables having keyword hits, generating ranking features of tables, and computing ranking scores for tables.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
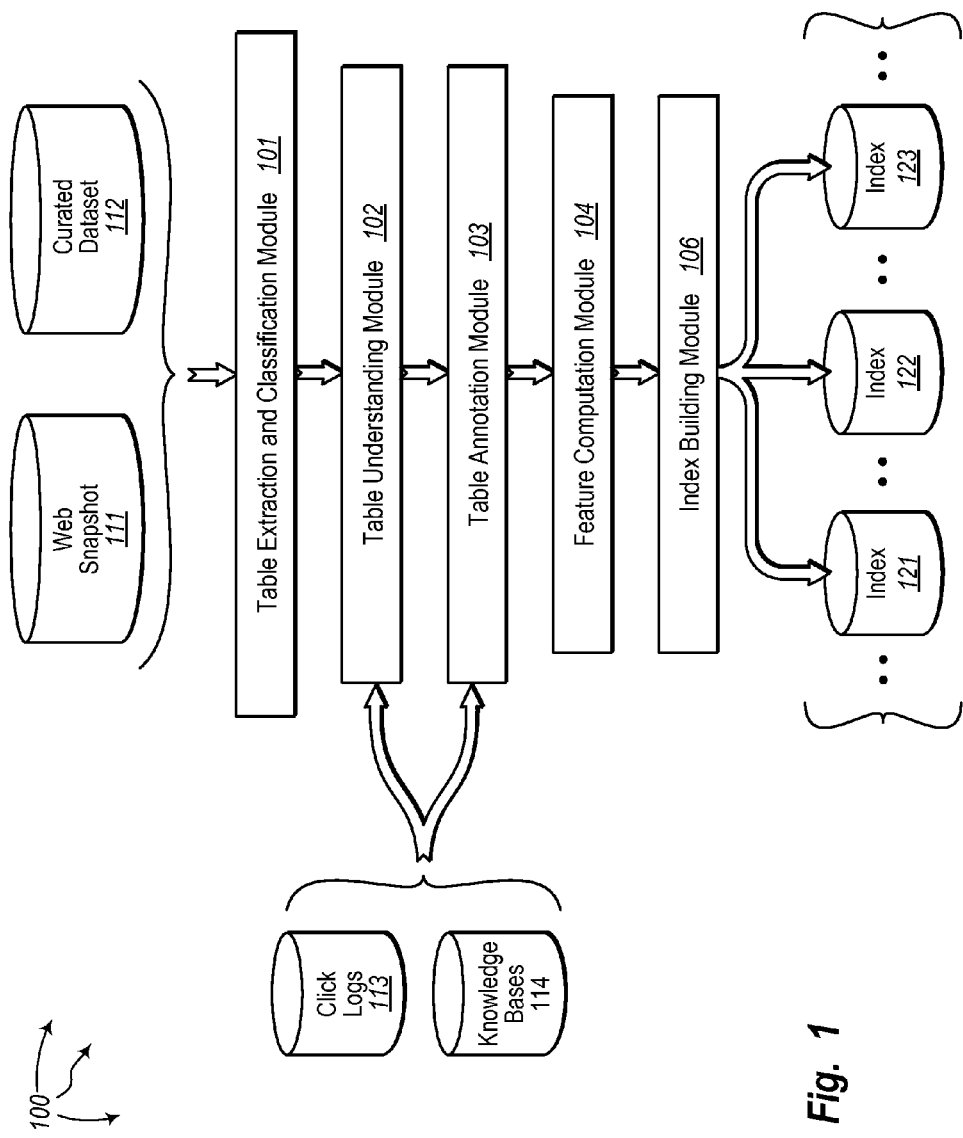
FIG. 1 illustrates an example computer architecture that facilitates building one or more indexes from one or more datasets of structured data.

The present invention extends to methods, systems, and computer program products for ranking tables for keyword search. Aspects of the invention include generating lists of candidate tables for inclusion in a search query response, computing table hit matrices, retrieving content from fields of candidate tables having keyword hits, generating ranking features of tables, and computing ranking scores for tables.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

In these description and the following claims, a "table" is defined as set of data elements (values) arranged in a two dimensional structure and having data along two axes. A table can include vertical columns and horizontal rows. Columns and rows can be viewed interchangeably. When a table is rotated 90 degrees, columns can transition to rows and rows can transition columns.

Each intersection of a row and column represents a cell. Rows can be identified by the values appearing in a specified column subset, for example, identified as a key index. Tables can be found in databases, in web pages, in curated datasets, captured from images (e.g., whiteboards), found in other files (e.g., Portable Document Format ("PDF") files), or found in other sources, etc. Aspects of the invention can be used to understand tables from any of these sources.

One or more columns of a table can be subject columns A subject column contains the names of entities the table is about. Other columns in a table represent relationships or attributes of entities in a subject column. A subject column can be viewed as an approximate key.

A row of a table can be a column header. A column header for a table contains names of the table's columns.

Aspects of the invention include computing features of tables that can be used for table ranking. For example, features of web tables can be computed. The computed features can be used to rank web tables relative to one another.

Index Build Architecture

FIG. 1 illustrates an example computer architecture 100 that facilitates building one or more indexes from one or more datasets of structured data. Referring to FIG. 1, computer architecture 100 includes table extraction and classification module 101, table understanding module 102, table annotation module 103, feature computation module 104, index building module 106, web snapshot 111, curated dataset 112, click logs 113, knowledge bases 114, and indexes 121, 122, 123, etc. Each of table extraction and classification module 101, table understanding module 102, table annotation module 103, feature computation module 104, index building module 106, web snapshot 111, curated dataset 112, click logs 113, and knowledge bases 114, and indexes 121, 122, 123, etc. can be connected to one another over (or be part of) a network, such as, for example, a Local Area Network ("LAN"), a Wide Area Network ("WAN"), and even the Internet. Accordingly, each of table extraction and classification module 101, table understanding module 102, table annotation module 103, feature computation module 104, index building module 106, web snapshot 111, curated dataset 112, click logs 113, and knowledge bases 114, and indexes 121, 122, 123, etc. as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

In general, computer architecture 100 can leverage web snapshot 111, and possibly also one or more curated datasets 112, to build one or more of indexes 121, 122, 123, etc. Computer architecture 100 can extract tables from web snapshot 111 and/or one or more curated datasets 112, understand and annotate the extracted tables, and build one or more of indexes 121, 122, 123, etc. based on the understanding/annotation of the tables. Indexes 121, 122, 123, etc. can then be used by an index server component to retrieve candidate results to user queries as well as rank candidate result tables based on relevance.

Within computer architecture 100, table extraction and classification module 101 can receive web snapshot 111 and/or curated data set 112 as input. Web snapshot 111 can include tables in HyperText Markup Language (HTML) format. Curated dataset 112 can include tables in a site specific format, such as, for example, data from data.gov or the World Bank. Web snapshot 111 and curated dataset 112 can be created using wrappers and/or crawlers that scrape sites, understand the format of those sites, and extract tables. For example, Web snapshot 111 can be created from scraping the Internet. Thus, Web snapshot 111 can include web tables. The web tables can be relational or non-relational. Some tables may expressly define a subject column and column headers. Other tables may lack an express definition of a subject column and/or column headers.

Table extraction and classification module 101 can extract tables from web snapshot 111 and/or curated data set 112. Table extraction and classification module 101 can filter out tables of no value, such as, for example, tables used for navigational/layout purposes. From any remaining tables, table extraction and classification module 101 can classify tables as relational and/or non-relational tables. In one aspect, table extraction and classification module 101 also filters out non-relational tables. Table extraction and classification module 101 can output tables (e.g., relational tables) for use by other modules in computer architecture 100.

Click logs 113 can include link selection information ("clicks") logged for a plurality of network users. For the Internet, click logs 113 can include link selection information for a larger plurality of users. Knowledgebases 114 can include different classes of knowledgebase. One class of knowledgebase can contain structured information about entities and/or relationships between entities, such as, for example, tables in web snapshot 111 and/or curated dataset 112. For example, a knowledge base can include information about table entities, including: entity names, entity types, entity attributes, and values for entity attributes. Another class of knowledgebase are those extracted from Web documents (e.g., using text patterns).

Table understanding module 102 can receive tables (e.g., relational tables) extracted by table extraction and classification module 101 as input. Table understanding module 102 can use various different table understanding algorithms to understand tables. Some tables may lack expressly defined subject columns and/or expressly defined column headers. As such, table understanding algorithms can be configured to identify subject columns for tables and/or detect column headers for tables when tables do not expressly define such information. Table understanding module 102 can utilize click logs 113 and knowledgebases 114 to assist with understanding tables. Table understanding module 102 can output identified subject columns and detected column headers for tables.

Table annotation module 103 can receive tables (e.g., relational tables) extracted by table extraction and classification module 101. Table annotation module 103 can also receive identified subject columns and detected column headers for tables (e.g., from table understanding module 102). Table annotation module 103 can use various different table annotation algorithms to annotate tables with relevant content that is not expressly defined as being associated with tables. For example, on a web page containing a table, content within <table> and </table> tags (e.g., cell values and column names) can be useful in supporting keyword and data finding searches.

However, there can also be additional content useful in supporting keyword and data finding searches that is not within <table> and </table> tags. For example, additional content can be on a web page outside <table> and </table> tags, additional content can be in other web pages containing links to the web page, additional content can be in click log data, etc. As such, table annotation algorithms can be configured to identify this additional content and annotate corresponding tables with the additional content. Subsequently, index building module 106 can generate inverted index over this additional content as well as content within <table> and </table> tags.

Table annotation module 103 can utilize click logs 113 and knowledge bases 114 to assist with identifying additional content and annotating corresponding tables with the additional content. Table annotation module 103 can output tables annotated with corresponding additional content.

Feature computation module 104 can receive tables. Feature computation module 104 can use various feature computation algorithms to compute (static) features of tables. The computed (static) features can be used for ranking. For example, feature computation module 104 can compute static (i.e., query independent) features of web tables for use in relevant ranking. Rankings can be used to help surface better (e.g., more reputed, more popular, or more relevant) web tables when many web tables satisfy a search query. Feature computation module 104 can output computed (static) features for tables.

Feature computation module 104 can be used with annotated or unannotated tables. When feature computation module 104 receives annotated tables, the various feature computation algorithms can use additional content contained in annotations to compute (static) features.

Index building module 106 can receive tables. Index building module 106 can use various index building algorithms to build one or more of indexes 121, 122, 123, etc. from received tables. Index building module 106 can receive annotated or unannotated tables. When index building module 106 receives annotated tables, the various index building algorithms can use additional content contained in annotations when building indexes. Index building module 106 can also access computed (static) features for tables. When index building module 106 accesses computed (static) features for tables, the various index building algorithms can use the computed (static) features when building indexes.

Each of indexes 121, 122, 123, etc. can be a different type of index, such as, for example, a keyword index, a forward index, a feature index, a content index, a string mapping index, a string frequency index, a cell level index, etc.

A keyword index can be an inverted index that contains mapping from keywords to various fields in a table. One example mapping is:
Keyword (WebTableId, FieldCode, ColIndex, RowIndex, # totalTokensInField, sumLogFrequency)
Where:
WebTableId is an unique identifier of the web table
FieldCode is the type of the field and can take one of the following values: ATTRNAMEINHEADER, ATTRNAMEINBODY, HEADER, CAPTION, FOOTER, PAGETITLE, PAGEHEADING, PAGEANCHORTEXT, SURROUNDINGTEXT, TABLECELL, URL, CLICKED QUERY
ColIndex is the index of the column. It is populated only for ATTRNAMEINHEADER, ATTRNAMEINBODY, TABLECELL; otherwise it is −1
RowIndex is the index of the row. It is populated only for TABLECELL; otherwise it is −1
totalTokensInField is the total number of tokens in the field
sumLogFrequency is the sum of the log of the frequencies of the tokens in the field; the frequency used in the one associated with the corresponding CoarseGrainedFieldType (CGFT) where CGFT can take one of the following values: DESCRIPTIONKEYWORD, ATTRNAME, CELL.
The mapping of CGFT to FieldCodes:
DESCRIPTIONKEYWORD→{HEADER, CAPTION, FOOTER, PAGETITLE, PAGEHEADING, PAGEANCHORTEXT, SURROUNDINGTEXT, URL, CLICKEDQUERY}
ATTRNAME→{ATTRNAMEINHEADER, ATTRNAMEINBODY}
CELL→{TABLECELL,}

A keyword index can store structural information relevant to searching tables. The elements #totalTokensInField and sumLogFrequency can be used to compute whether a match of a query with content of a field is a full or partial match.

A forward index returns the entire content for any given field of any given table.

A feature index contains static features for tables (e.g., web tables) and other tables derived from the web tables. A table feature index can contain number of rows in a table, number of columns in a table, position of table relative to page, size of table relative to page, static rank of page containing table (e.g., form a search engine), domain rank of page containing the table (e.g., form a search engine), etc. A column feature index can contain number of distinct values, fraction of null names and attribute popularity numbers.

A context index can contain the content of the tables. A content index can be used to generate snippet for each table and to display the actual table when requested. A context index can contain original html, parsed html, url, caption, column names, header rows, footer rows, page title, page heading, anchortext, surroundingtext, metakeywords, metadescription and ODPcategories.

A string mapping index contains global string to ID mapping across all tables, all field. A string frequency index maps stringid to frequency for various Coarse Grained Field Types (CGFT). There is also an overall frequency irrespective of fields.

A cell level index maps an entity name to tables (e.g., web tables or other tables derived therefrom) that contain that entity (in the key column) and its corresponding value.

Table Ranking Architecture

Indexes can be used to facilitate searches, including key word searches. In keyword search, a user expresses intent using a set of keywords (e.g., "african countries gdp", "cities in washington"). A structured data search system ("SDSS") finds tables (e.g., web tables) that match the intent. Depending on intent, a query can contain terms to be matched with metadata (e.g., table descriptions, column names) and/or with the data (cell values). Entity values can also be distinguished from non-entity (e.g., attribute) values.

Aspects of the invention can understand the intent of a query and match the different keywords with the appropriate semantic locations (e.g., description vs column, name vs entity, column vs value column, etc.) inside a table. The importance of one or more of table features, column features, and cell features can also be considered. Features can include popularity, importance, trustworthiness, etc.

Figure 2:
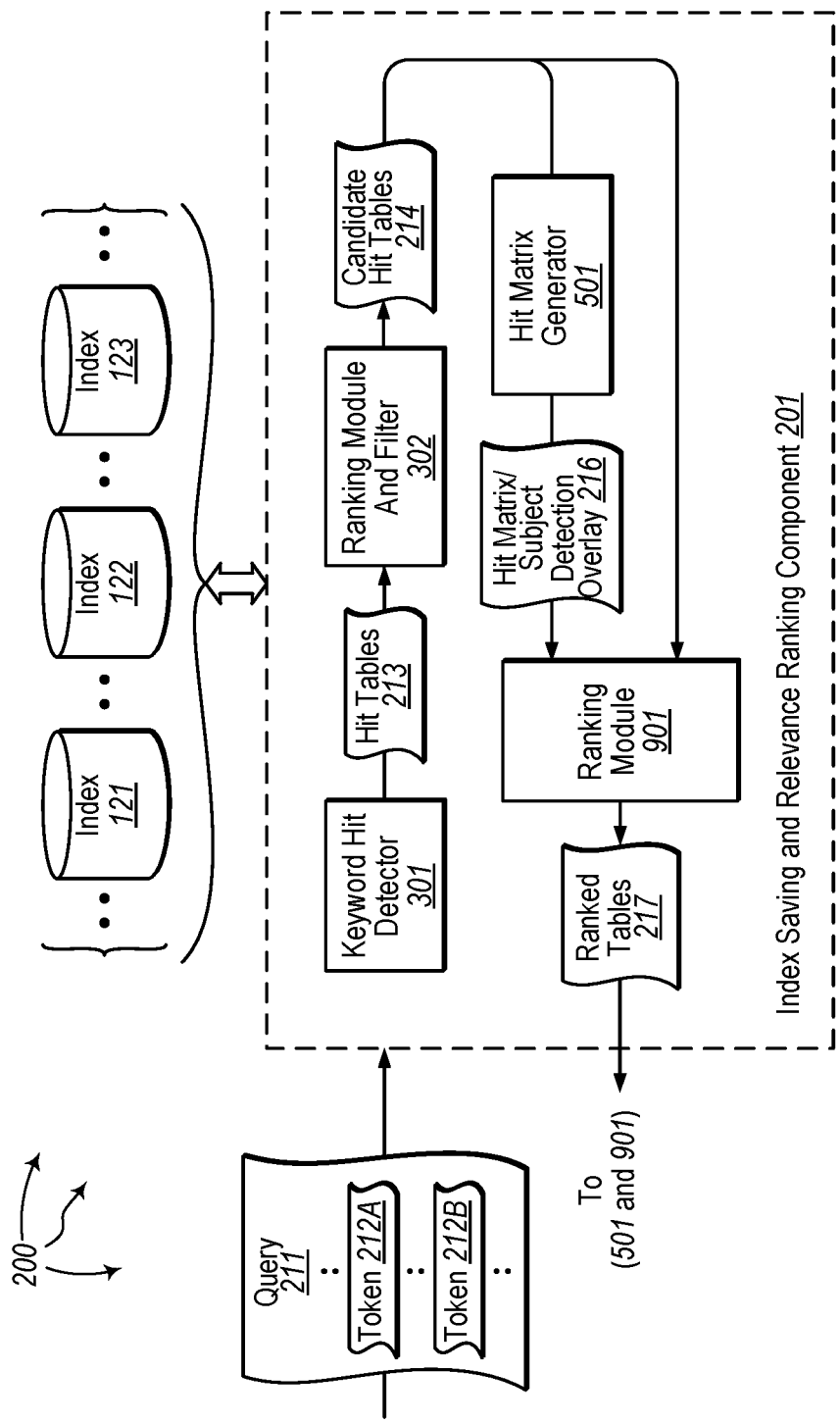
FIG. 2 illustrates an example computer architecture that facilitates ranking tables.

FIG. 2 illustrates an example computer architecture 200 that facilitates ranking tables. Referring to FIG. 2, computer architecture 200 includes index serving and relevance ranking component 201 and indexes 121, 122, 123, etc. Table ranking component 201 further includes keyword hit detector 301, ranking module and filter 302, hit matrix generator 501, and ranking module 901. Each of hit detector 301, ranking module and filter 302, hit matrix generator 501, and ranking module 901, and indexes 121, 122, 123, etc. can be connected to one another over (or be part of) a network, such as, for example, a Local Area Network ("LAN"), a Wide Area Network ("WAN"), and even the Internet. Accordingly, each of hit detector 301, ranking module and filter 302, hit matrix generator 501, and ranking module 901, and indexes 121, 122, 123, etc. as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

Index serving and relevance ranking component 201 can be included in a structured data search system ("SDSS").

Alternatively, Index serving and relevance ranking component 201 can operate outside of a structured data search system ("SDSS").

In general, keyword hit detector 301 is configured to compile a list of tables (e.g. web tables) that have any keyword hit. Tables that include a keyword hit can be referred to as "hit tables". Ranking module and filter 302 is configured to compute an approximate ranking score for any hit tables. Ranking module and filter 302 is also configured to filter out hit tables that have an insufficient approximate ranking score (e.g., below a specified threshold). Remaining tables have a sufficient approximate ranking score and are considered candidate tables for returning in query (search) results.

Hit matrix generator 501 is configured to generate a hit matrix for each candidate table. A hit matrix indicates keyword hit positions in each field of a candidate table. Hit matrix generator 501 is also configured to retrieve features for each candidate table from a feature index. Retrieved features can include page rank of the web page the candidate table comes from, which columns are entity columns, which columns are attribute columns, how many nulls in each column, how many distinct values in each columns, etc.

Hit matrix generator 501 is also configured to conceptually overlay the hit matrix with column type information to put keyword hits in logical regions (e.g., a hit/matrix subject detection overlay). Hit matrix generator 501 is further configured to retrieve content of fields containing at least one keyword hit of the candidate tables using a forward index.

Ranking module 901 is configured to receive input features for a candidate table. Input features can include a candidate table's static features, a candidate table's dynamic features (derived from a hit matrix/subject detection overlay), and a query's features. Ranking module 901 is further configured to derive ranking features, including query keyword hit data for one or more different portions of table related data associated with a candidate table. Ranking module 901 is additionally configured to generate a ranking score for a candidate table from the ranking features.

Thus, keyword hit detector 301 can receive query 211. As depicted, query 211 includes token 212A, token 212B, etc. Keyword hit detector 301 can compile hit tables 213. Hit tables 213 can include any table (e.g., any web table) that has a hit for token 212A, token 212B, etc.

Ranking module and filter 302 computes an approximate ranking score for each table included in hit tables 213. Ranking module and filter 302 also configured filters out any of hit tables 213 that have an insufficient approximate ranking score (e.g., below a specified threshold). Remaining tables are included in candidate hit tables 214. Each table in candidate hit tables 214 has a sufficient approximate ranking score and is considered a candidate table for returning in query (search) results response to query 211.

Hit matrix generator 501 generates a hit matrix for each table in candidate hit tables 214. For each table, hit matrix generator 501 uses a feature index to formulate a hit matrix/subject detection overlay 216. Hit matrix/subject detection overlay 216 overlays the corresponding hit matrix with column type information to put keyword hits in logical regions of the table (e.g., caption, surrounding text, column name, entity column, cell, etc.). Hit matrix generator 501 then retrieves the content of fields containing at least one keyword hit in a candidate hit table 214 using a forward index.

For each table in candidate hit tables 214, ranking module 901 accesses static features of the table. For each table in candidate hit tables 214, ranking module 901 also using hit matrix/subject detection overlays 216 to compute dynamic features of the table. Ranking module 901 also accesses features of query 211. Ranking module 901 uses the static table features, the dynamic table features, and the query features to derive one or more ranking features for each table in candidate hit tables 214. From the ranking features, ranking module 901 can compute ranked tables 217. Ranked tables 217 can be returned in response to query 211.

Aspects of the invention can be used to match keywords against column names, to match keywords against values in subject and non-subject columns, and to match keywords against table descriptions like page titles, table captions, cell values, nearest headings and surrounding text. Which keywords are matched against which fields can depends on the table and/to the query (referred to as "late binding").

Ranking Tables From Keyword Hits

Figure 3:
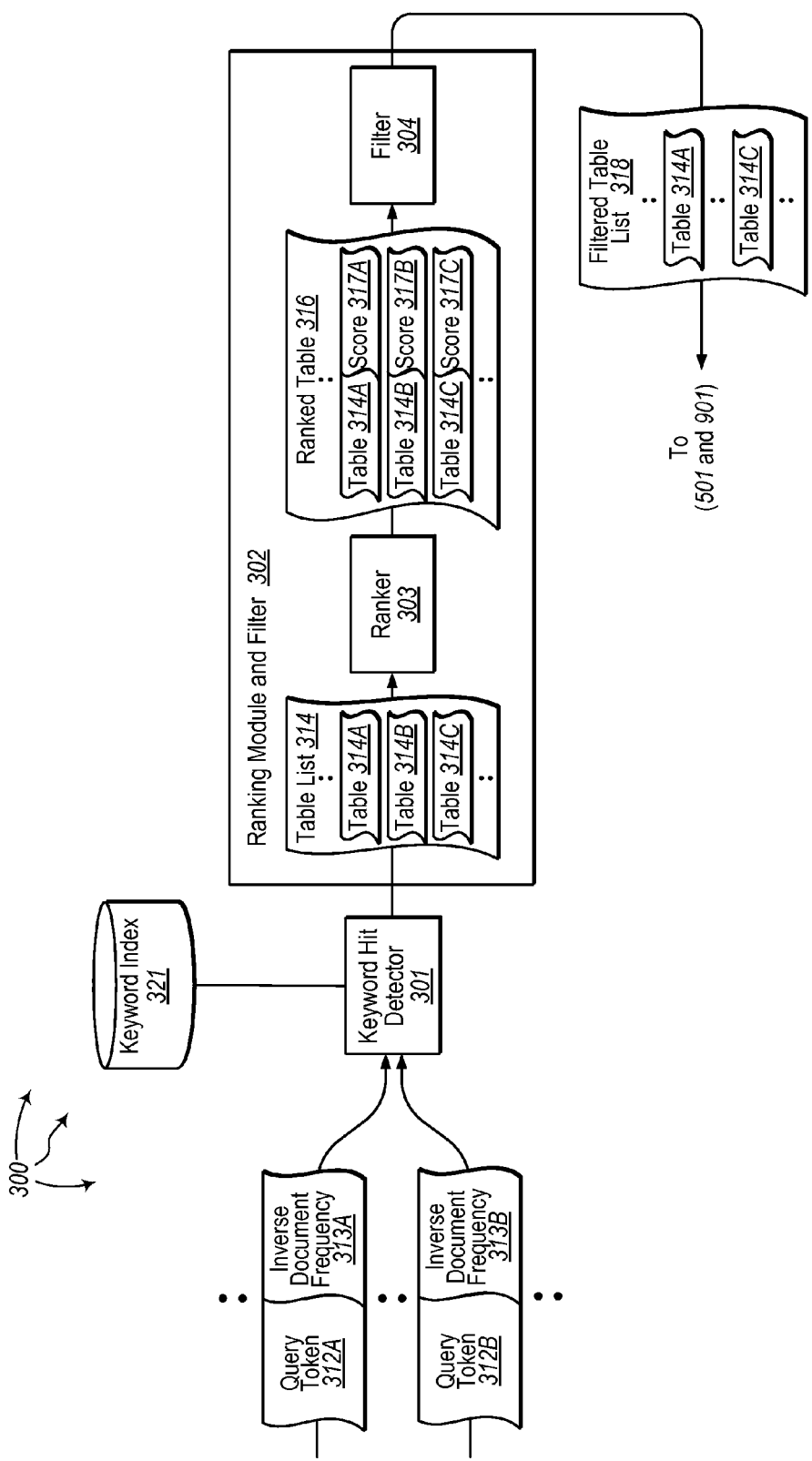
FIG. 3 illustrates an example computer architecture that facilitates ranking tables from keyword hits.

FIG. 3 illustrates an example computer architecture 300 that facilitates ranking tables from keyword hits. Referring to FIG. 3, computer architecture 300 includes keyword hit detector 301, ranking module and filter 301, and keyword index 321. Keyword index 321 can be an index output from index building module 106 (e.g., one of index 121, 122, 123, etc.).

Ranking module and filter 302 further includes ranker 303 and filer 304. Ranker 303 is configured to compute an approximate ranking score for each hit table. Filter 304 is configured to filter out hit tables having an insufficient score (e.g., below a specified threshold).

Figure 4:
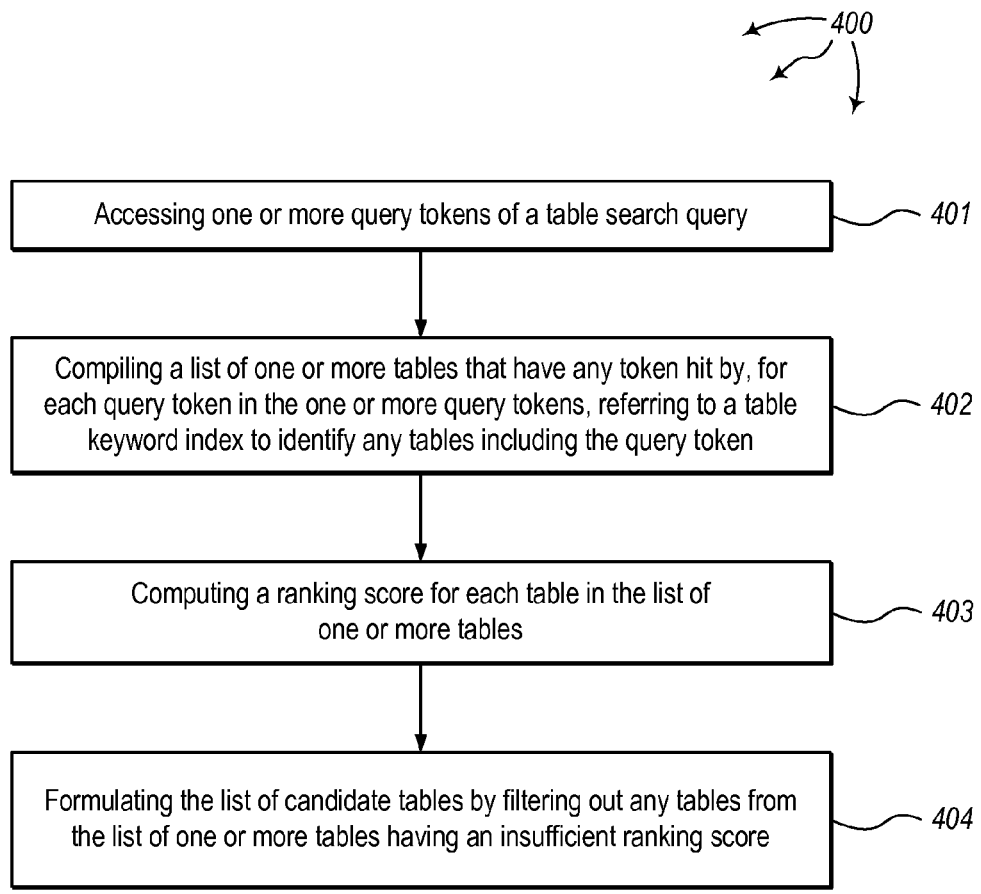
FIG. 4 illustrates a flow chart of an example method for ranking tables from keyword hits.

FIG. 4 illustrates a flow chart of an example method 400 for ranking tables from keyword hits. Method 400 will be described with respect to the components and data in computer architecture 300.

Method 400 includes accessing one or more query tokens of a table search query (401). For example, keyword hit detector 301 can access query token 312A and query token 312B. Query tokens can be accessed along with corresponding inverse document frequencies. For example, query tokens 312A and 312B can be accessed along with inverse document frequencies 313A and 313B respectively.

Method 400 includes compiling a list of one or more tables that have any token (keyword) hit by, for each query token in the one or more query tokens, referring to a table keyword index to identify any tables including the query token (402). For example, keyword hit detector 301 can compile table list 314, including tables 314A, 314B, 314C, etc. (e.g., web table). Each of tables 314A, 314B, 314C, etc. has a keyword hit for at least one of query token 312A, 312B, etc. Keyword hits include hits in hidden fields, such as, clicked query and anchor text). Table list 314 can be compiled by, for each of query token 312A, 312B, etc., referring to keyword index 321 to identify any tables that include query token 312A, 312B, etc.

Method 400 includes computing a ranking score for each table in the list of one or more tables (403). For example, ranking 303 can compute approximate ranking scores 317A, 317B, and 317C, etc. for tables 314A, 314B, 314C, etc. respectively. An approximate ranking score can be computed from the sum of the inverse document frequency for any included query tokens, including query tokens in hidden fields (such as clicked query and anchor text). For example, it may be that table 314A contains a hit for query token 312A and query token 312B. Thus, score 317A is the sum of inverse document frequency 313A+inverse document frequency 313B. Ties between tables can be broken using static rank (pagerank) of web pages containing tables.

Method 400 includes formulating the list of candidate tables by filtering out any tables from the list of one or more tables having an insufficient ranking score (404). For example, filter 304 can formulate filtered table list 318. Filtered table list 318 includes table 314A and table 314C (i.e., candidate tables). Filter 304 has filtered out table 314B based on score 317A being insufficient.

In one aspect, a specified number of tables with higher approximate ranking scores (e.g., the top 10000 tables) are selected from table list 314 for further processing. In another aspect, a score threshold is selected. Any table in table 314 having an approximate ranking score meeting the threshold can be selected for further processing. Filtering out tables helps insure that further processing is performed on more promising candidate tables.

Filter 304 can send filtered table list 318 to hit matrix generator 501 and/or ranking module 901.

Accessing Field Content for Fields that Contain Keyword Hits

Figure 5:
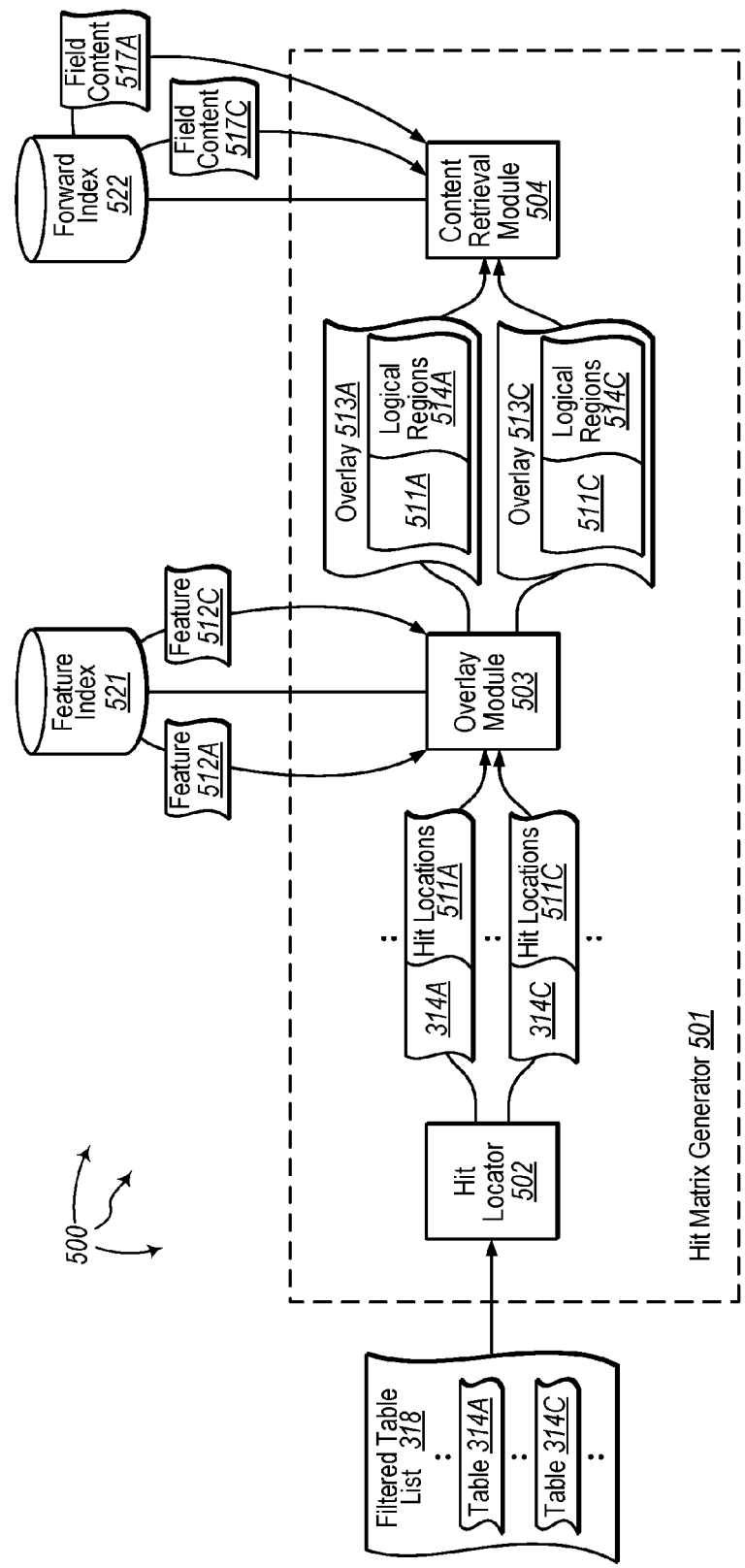
FIG. 5 illustrates an example computer architecture that facilitates accessing field content for fields that contain keyword hits.

FIG. 5 illustrates an example computer architecture 500 that facilitates accessing field content for fields that contain keyword hits. Referring to FIG. 5, computer architecture 500 includes hit locator 502, overlay module 503, and content retrieval module 504. In one aspect, hit locator 502, overlay module 503, and content retrieval module 504 are contained in hit matrix generator 501. In another aspect hit locator 502, overlay module 503, and content retrieval module 504 operate outside of hit matrix generator 501.

Hit locator 502 is configured to determine locations of keyword hits within table related data for candidate tables. Hit locator 502 can determine fields containing keyword hits as well as (potentially detailed) keyword hit positions within determined fields. In one aspect, hit locator 502 generates a hit matrix for each candidate table.

Figure 7:
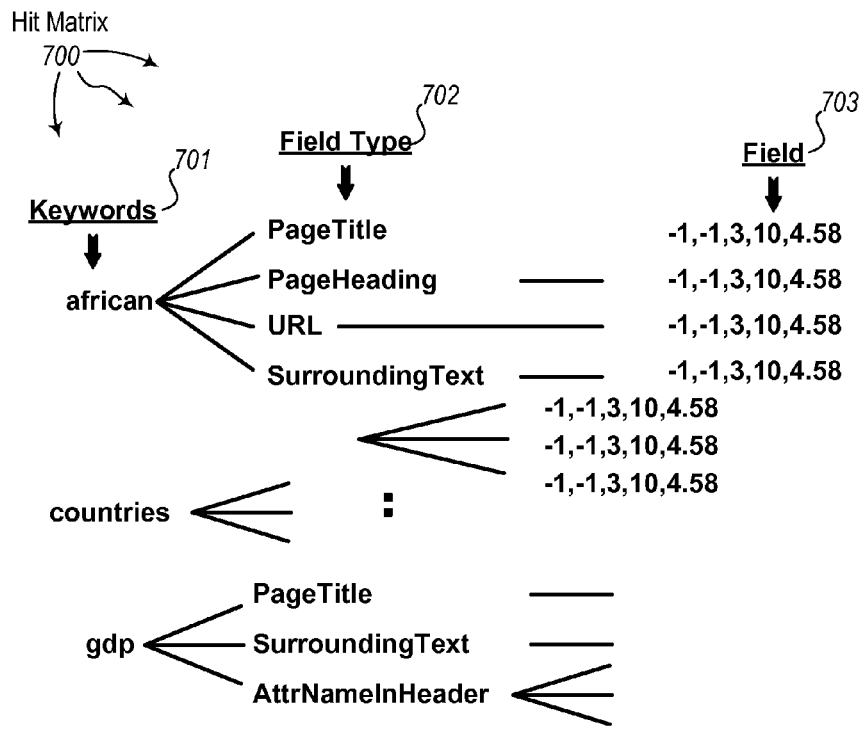
FIG. 7 illustrates an example keyword hit matrix.

FIG. 7 illustrates an example keyword hit matrix 700. As depicted, hit matrix 700 includes keywords 701, field 702 (the field containing a keyword hit), and field location (the location within the field where the keyword hit was detected. For example, the keyword African was contained in the PageTitle, PageHeading, URL, and Surrounding Text of a table. Likewise, gdp was contained in the PageTitle, Surrounding Text, and AttrNameInHeader of the table.

Figure 8:
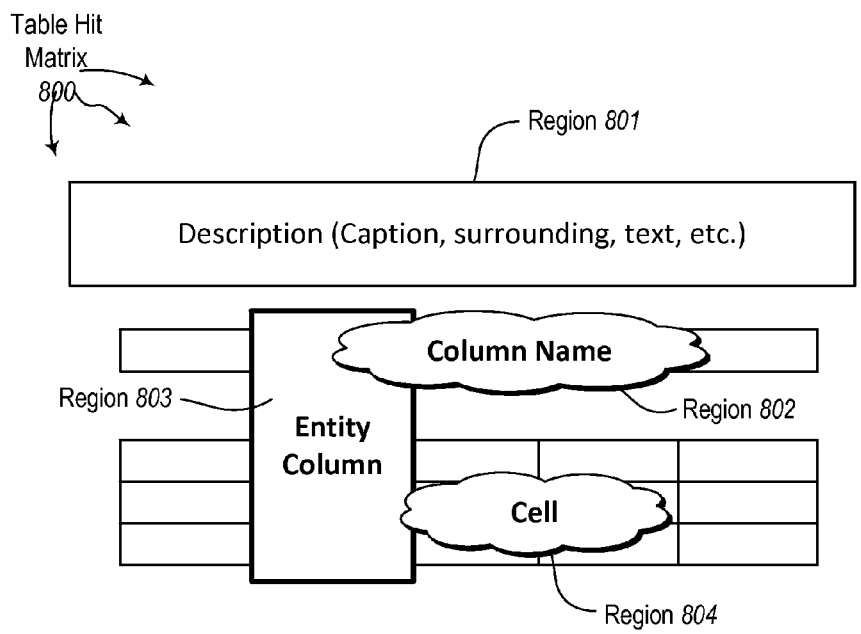
FIG. 8 illustrates an example table hit matrix by region.

Overlay module 503 is configured to overlay a hit matrix with column type information to put keyword hits in logical regions. Column type information can include which columns are entity columns, which columns are attribute columns, how many nulls in each column, how many distinct values in each column, etc. Column type information can be accessed from a feature index. FIG. 8 illustrates an example table hit matrix 800 by region. As depicted, table hit matrix 800 is separated into region 801 (description, such as, caption, surrounding text, etc), region 802 column name, region 803 entity column, and region 804 cell. Thus, for example, a keyword hit in a caption is put in region 801.

Other overlays, such as, for example, spatial hit patterns, can include hits in a row, hits in a column, hits in a subject column+hit in a column name, subject cell+same row value hit, etc. All of these different combinations of cell-hit patterns can be derived features.

Content retrieval module 504 is configured to access content of candidate table fields containing at least one keyword hit. Content retrieval module 504 can refer to a forward index to access field content.

Figure 6:
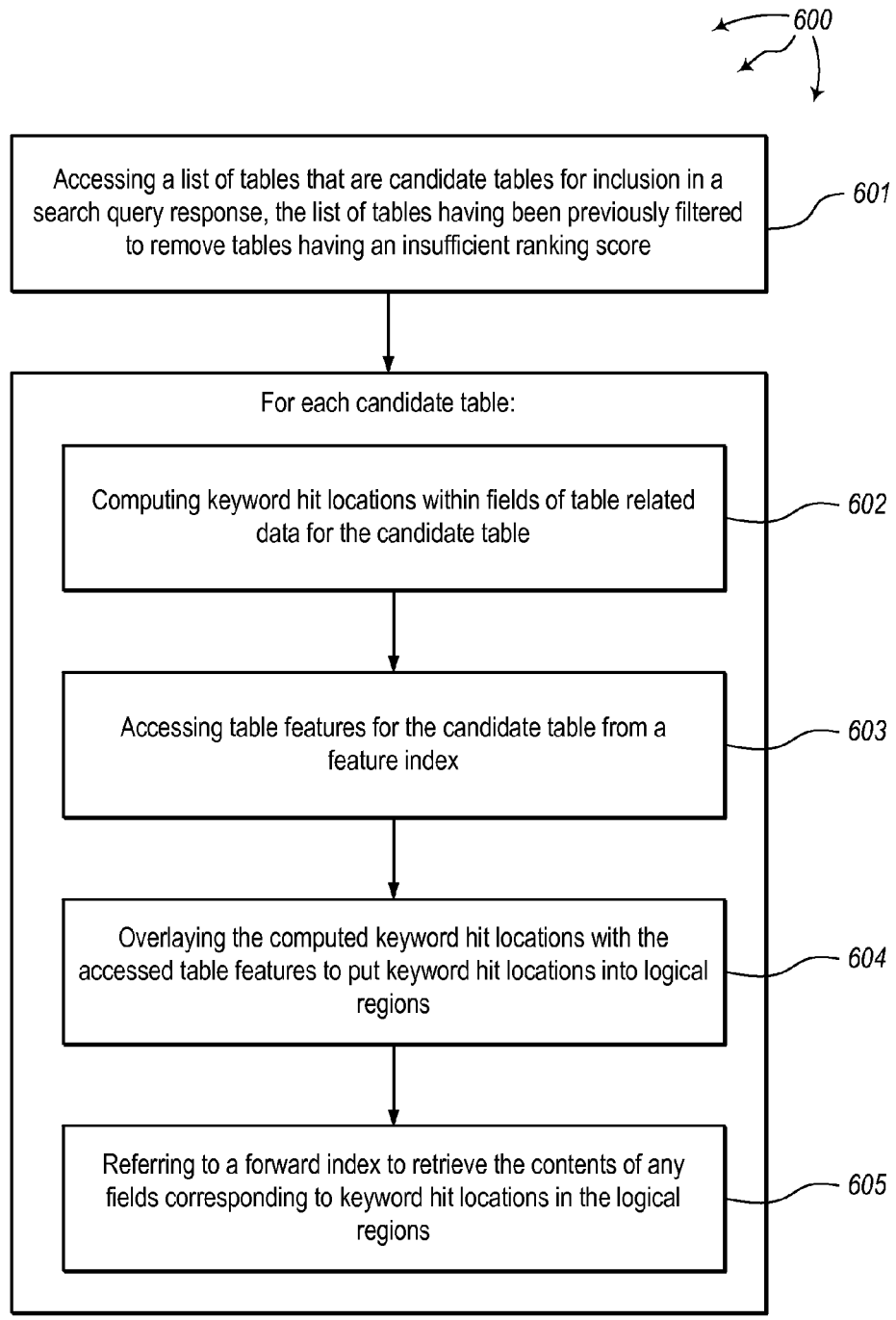
FIG. 6 illustrates a flow chart of an example method for accessing field content for fields that contain keyword hits.

FIG. 6 illustrates a flow chart of an example method 600 for accessing field content for fields that contain keyword hits. Method 600 will be described with respect to the components and data in computer architecture 500.

Method 600 includes accessing a list of tables that are candidate tables for inclusion in a search query response, the list of tables having been previously filtered to remove tables having an insufficient ranking score (601). For example, hit locator 502 can access filtered table list 318 from filter 304.

Method 600 includes for each candidate table, computing keyword hit locations within fields of table related data for the candidate table (602). For example, hit locator 502 can compute hit locations 511A, 511C, etc. for tables 314A, 314C, etc. respectively. Hit locations for a candidate table indicate locations within fields of table related data corresponding to the table (e.g., caption, surrounding text, Page Title, entity column, attribute column, etc.) where keyword hits occurred. For example, hit locations 511A indicate locations within fields of table related data corresponding to the table 314A where keyword hits (of, for example, query tokens 312A, 312B, etc.) occurred.

Method 600 includes for each candidate table, accessing table features for the candidate table from a feature index (603). For example, overlay module 503 can access features 512A and 512C for tables 314A and 314C respectively from feature index 521. Method 600 includes for each candidate table, overlaying the computed keyword hit locations with the accessed table features to put keyword hit locations into logical regions (604). For example, overlay module 503 can generate overlays 513A and 513B for candidate tables 314A and 314C respectively. Overlay 513A (for table 314A) overlays hit locations 511A with features 512A to put keyword hit locations 511A in logical regions 514A. Similarly, overlay 513C (for table 314C) overlays hit locations 511C with features 512C to put keyword hit locations 511C in logical regions 514C.

Method 600 includes for each candidate table, referring to a forward index to retrieve the contents any fields corresponding to keyword hit locations in the logical regions (605). For example, content retrieval module 504 can refer to forward index 522 to access field content 517A for hit locations 511A in logical regions 514A. Similarly, content retrieval module 504 can refer to forward index 522 to access field content 517C for hit locations 511C in logical regions 514C.

Ranking Tables From Table Features

Figure 9:
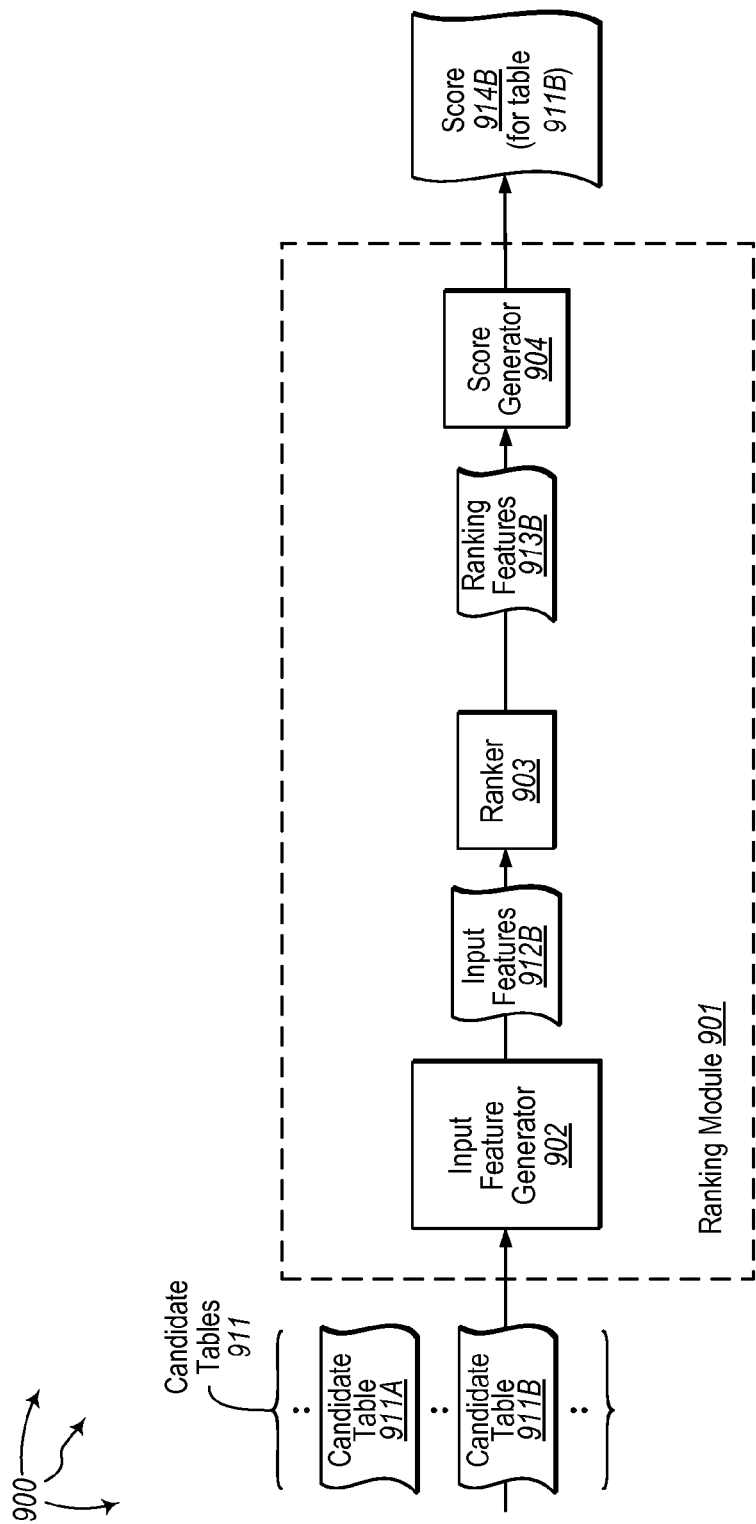
FIG. 9 illustrates an example computer architecture that facilitates ranking tables from features.

FIG. 9 illustrates an example computer architecture 900 that facilitates ranking tables from features. As depicted, computer architecture 900 includes input feature generator 902, ranker 903, and score generator 904. In one aspect, feature generator 902, ranker 903, and score generator 904 are contained in ranking module 901. In another aspect feature generator 902, ranker 903, and score generator 904 operate outside of ranking module 901.

Input feature generator 902 is configured to compute a set of input features for a table. Input features can include a table's static features, dynamic features, and query features.

A table's static features can include one or more of:
(1) A static rank of web page from which the table is extracted
(2) A domain rank of the web page from which the table is extracted
(3) A click count of web page from which that table is extracted
(4) A subject column index
(5) Entity
(6) An attribute popularity of each attribute column (that is, non-subject column)
(7) Number of rows in the table
(8) Types of each column, for example, string or numeric or date
(9) Statistics of each column, for example, the average number of tokens in each column

(10) Values of table's fields such as caption, column names

By overlaying hit matrix and subject detection dynamic features can be determining, including distinguishing keyword hits in different semantic locations:

(1) Subject column name
(2) Subject column values
(3) Attribute column names
(4) Attribute column values
(5) Table caption
(6) Context locations such as URL and title of the web page from which the table is extracted, all the heading elements that are children of the table's parent or grandparent in the DOM tree of the web page, and the preceding P sibling elements in the DOM tree A query's features can include one or more of:

(1) IDF of each keyword
(2) For each keyword whether it is a stop word
(3) For each keyword whether it is a numeric token or alphanumeric token
(4) Translation model of each keyword. A translation model can be used match synonymous related words. For example, a translation model can be used to determine that "elevation" and "height" are essentially the same in the context of mountains.

Input feature generator 902 can send generated input feature to ranker 903.

Ranker 903 is configured to receive input features for a candidate table and derive table ranking features for the candidate table. Ranking features can indicate how many subject column values have keyword hits, and for each subject column value that has keyword hits, how much it overlaps with keyword hits. These hits are interpreted as entity hits for the query.

Ranking features can indicate how much overlap between the subject column name and query. Ranking features can indicate how many attribute column names has keyword hits and the overlap ratio. Ranking features can indicate how many attribute column values have keyword hits, and for each attribute column value that has keyword hits, what is the overlap ratio, and whether there are keyword hits in the subject column value in the same row and what is the overlap ratio.

Ranking features can indicate which keywords hit caption, url, title, page level heading, all the headings combined, surrounding text. A base score ranking can be computed from a weight sum of the inverse document frequency of keywords. A base score ranking can approximate a BM25F ranking function with base TF always 1. Document length is ignored. TF is multiplied by a constant if there is phrase match, TF is multiplied by the jaccard between cell and user query (can be done for column name and Headings H1-H4 as well). The field type weight can be based on the query type (i.e., unknown, concept, concept attribute, entity, entity attribute) where the query type is determined based on where the keywords hit the table.

Ranking features can indicate the keyword hits induced by translation models in subject column name, attribute column names, caption, url, title, page level heading, all the headings combined. Ranking features can indicate attribute popularity of the attribute columns that has keyword hits in the column names. Ranking features can indicate the static rank and the click count of the web page.

Ranking features can indicate how many clicked queries have keyword hits. The sum of TF*IDF of keywords can be used, where TF is 1 and multiplied by some constant if there is phrase match, and then sum*clicked query's trusted factor*jaccard between clicked query and user query.

Ranking features can indicate whether the column that has keyword hit in column name has null or single value.

Ranking features can include proximity of the cell hits. That is, lifting proximity from within a cell (intra-cell hits) to proximity of cell-level hits. Many of the same proximity scores could apply, but now on cells instead of tokens. Cell hits that are more dispersed and not as co-located may be spurious hits. The pattern of hits can also influence a generated snippet. If hits are in a row, the whole row might be returned; if hits are in a single column, the full column might be returned.

Score generator 904 is configured to receive one or more table ranking features from ranker 903. Score generator 904 can compute a ranking score for a table as a weighted sum of ranking features. In one aspect, ranking features weights are manually tuned. In another aspect, ranking feature weights are determined using a LamdaMART model trained from a set of relevant judgements.

Figure 10:
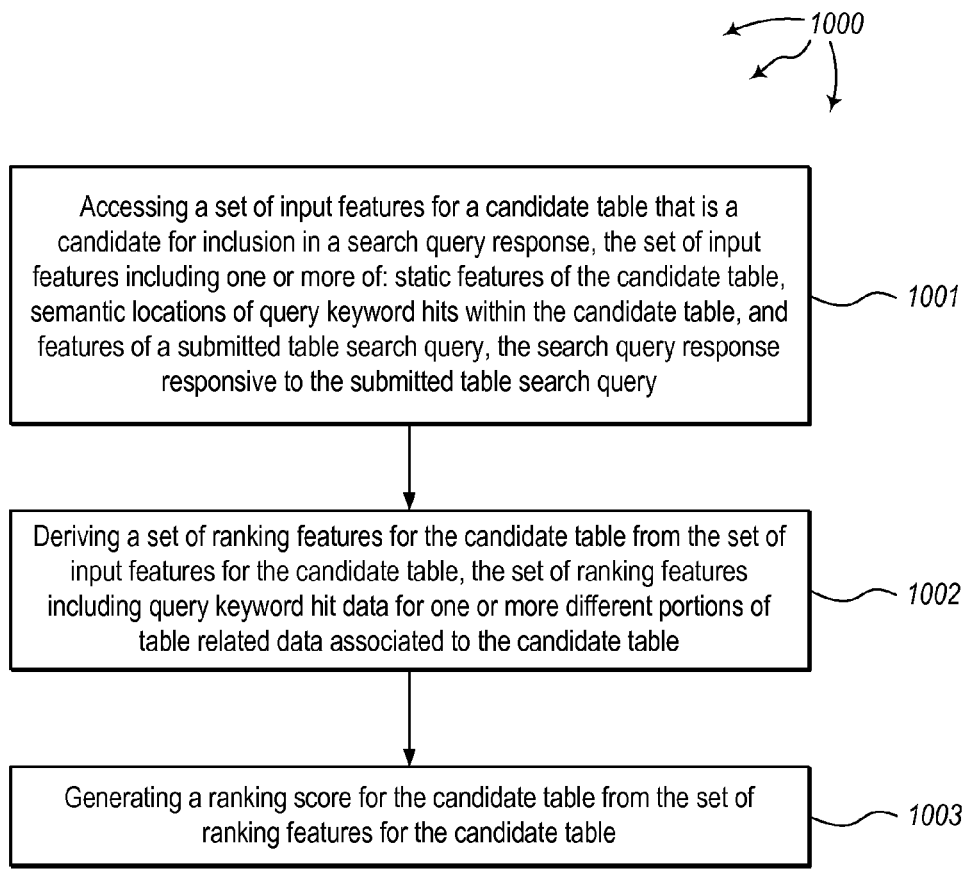
FIG. 10 illustrates a flow chart of an example method for ranking tables from features.

FIG. 10 illustrates a flow chart of an example method 1000 for ranking tables from features. Method 1000 will be described with respect to the components and data in computer architecture 900.

Input feature generator 902 can receive candidate tables 911, including candidate table 911A and 911B. Candidate tables 911 can be tables previously identified (possibly by components of computer architecture 300) as candidates to be returned in response to a table search query. Input generation 902 can also have access to other information associated with candidate tables 911, such as, for example, hit matrices, hit matrices overlays, field contents, etc.

Input feature generator 902 can generate input features 912B for candidate table 911B from candidate table 911B, data contained in indexes, hit matrices from candidate table 911B, hit matrices overlays from candidate table 911B, field contents of fields of table 911B, etc. Input features 912 can include static features of candidate table 911B, semantic locations of various keyword hits, and features of a submitted query (e.g., query 211). Input feature generator can send input features 912B to ranker 903.

Method 1000 includes receiving a set of input features for a candidate table that is a candidate for inclusion in a search query response, the set of input features including one or more of: static features of the candidate table, semantic locations of query keyword hits within the candidate table, and features of a submitted table search query, the search query response responsive to the submitted table search query (1001). For example, ranker 903 can receive input features 912B from input feature generator 902.

Method 1000 includes deriving a set of output features for the candidate table from the set of input features for the candidate table, the set of output features including query keyword hit data for one or more different portions of table related data associated to the candidate table (1002). For example, ranker 903 can derive ranking features 913B for candidate table 911B. Ranking feature 913C can be derived from input features 912B. Ranking features 913C can include keyword hit data for various portions of table related data associated with candidate table 911B. Ranking features 913C can include any of the described ranking features.

Ranker 903 can send ranking features 913C to score generator 904. Score generator 904 can receive ranking features 913C from ranker 903.

Method 1000 includes generating a ranking score for the candidate table from the set of output features for the candidate table (1003). For example, score generator 904 can generate score 914 for table 911C from ranking features 913C. Score 914B can be a weight sum of features included in ranking features 913C. Score 914B can be used to rank candidate table 911B relative to other tables, such as, for example, relative to candidate table 911A, relative to other tables in web snapshot 111, relative to other tables in curated data set 112, etc.

Concept-Attribute Queries

Figure 11:
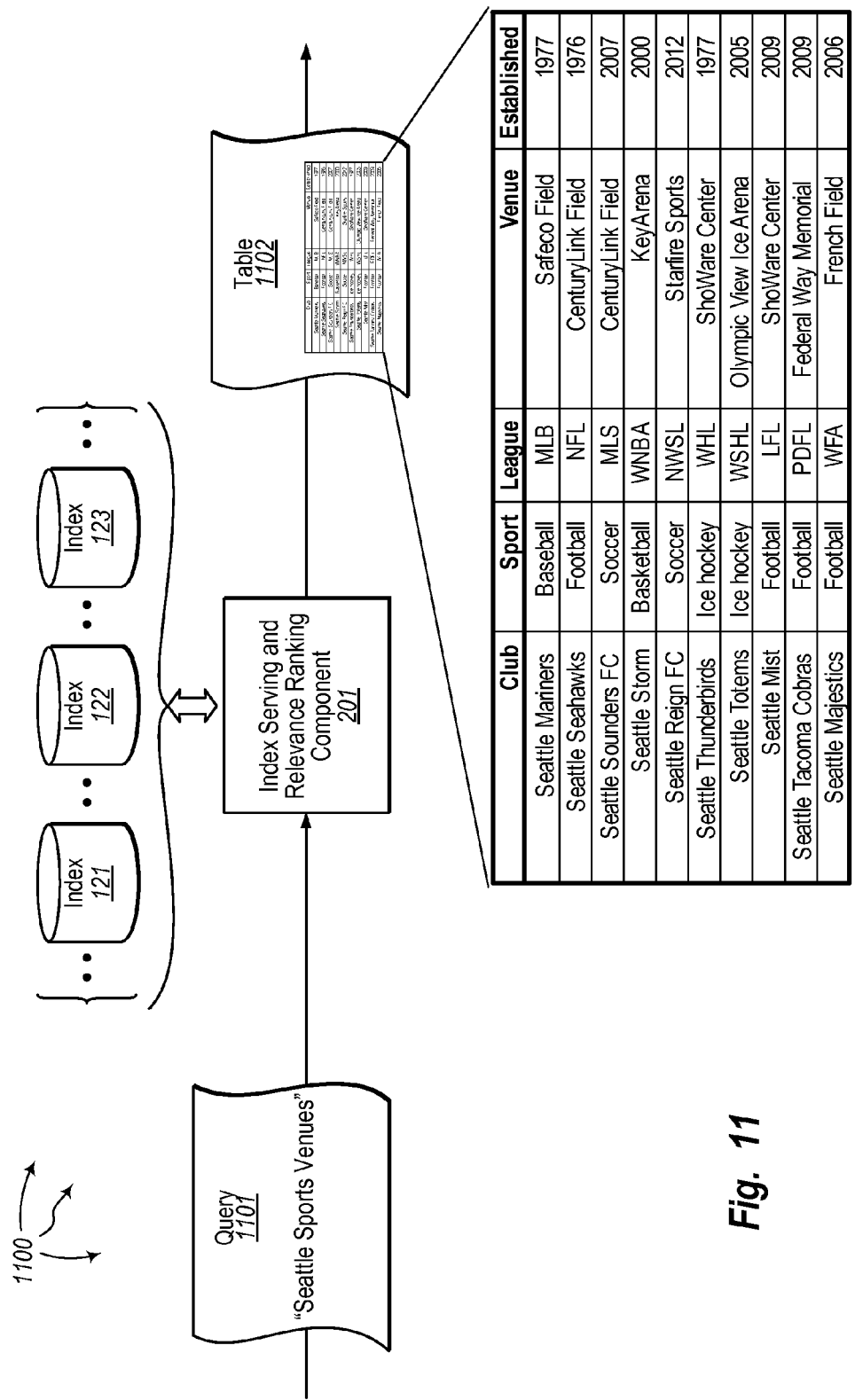
FIG. 11 illustrates an example computer architecture for returning a table matching a concept-attribute query.

FIG. 11 illustrates an example computer architecture 1100 for returning a table matching a concept-attribute query. As depicted in computer architecture 1100. Index serving and relevance ranking component 201 is connected to indexes 121, 122, 123, etc. Query 1101 "Seattle Sports Venues" is received at table ranking component 201.

The intent of query 1101 is to get the major sports venues in the city of Seattle. Index serving and relevance ranking component 201 can determine that table 1102 is an appropriate (and possibly very good) match for query 1101. Index serving and relevance ranking component 201 can match "Seattle" against the page title for table 1102 and/or against the values in subject column (the leftmost column) and "sports" and "venue" against the column names.

Entity-Attribute Queries

Figure 12:
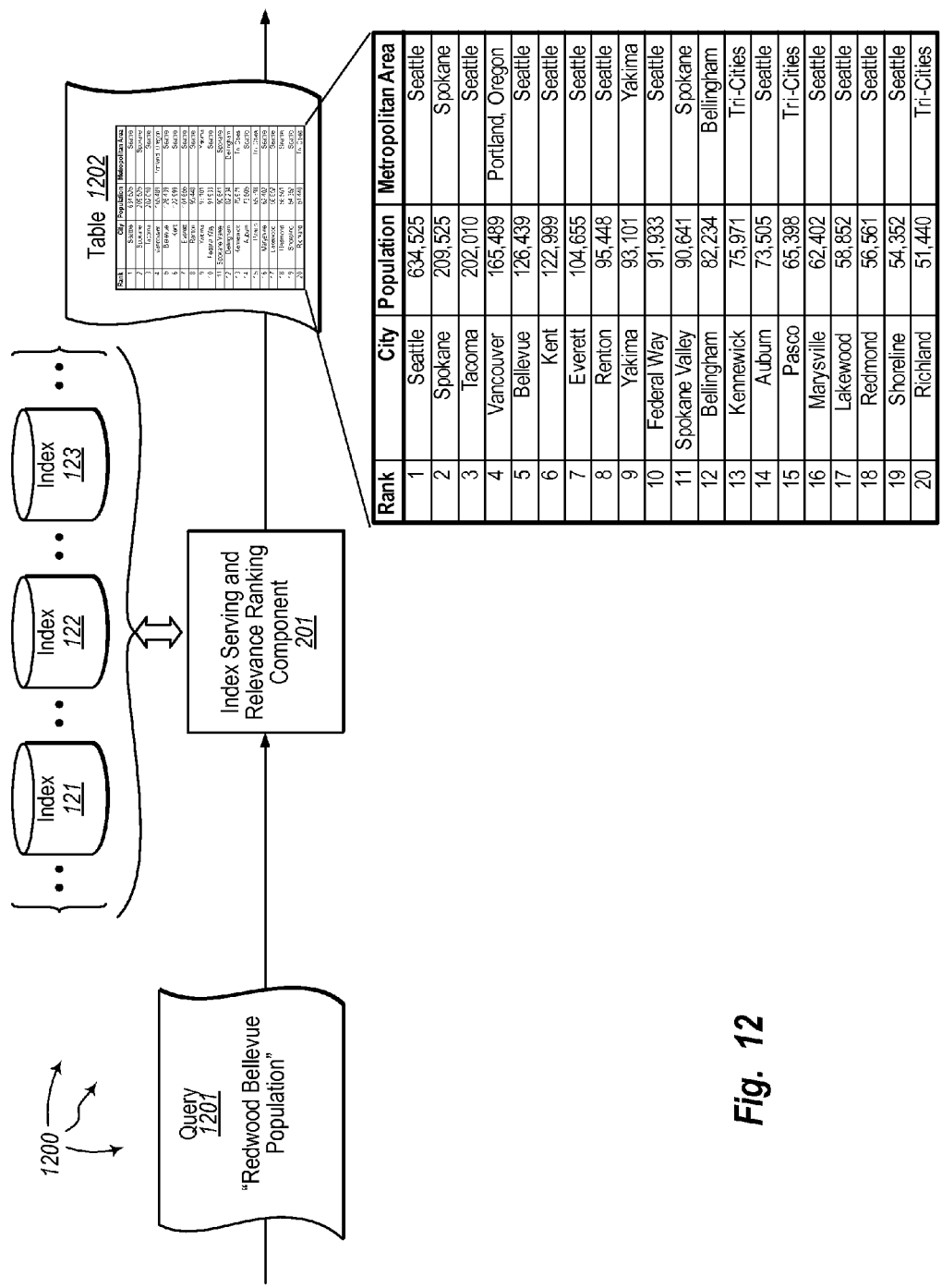
FIG. 12 illustrates an example computer architecture for returning a table matching an entity-attribute query.

FIG. 12 illustrates an example computer architecture 1200 for returning a table matching an entity-attribute query. As depicted in computer architecture 1200. Index serving and relevance ranking component 201 is connected to indexes 121, 122, 123, etc. Query 1201 "remond, bellevue population" is received at table ranking component 201.

The intent of query 1201 is to get the population of the two cities Redmond and Bellevue (near Seattle). Index serving and relevance ranking component 201 can determine that table 1202 is an appropriate (and possibly very good) match for query 1201. Index serving and relevance ranking component 201 can match "Redmond" and "Bellevue" against the subject column (the "City" column in this table) and "population" against the column names.

Concept-Filter Queries

Figure 13:
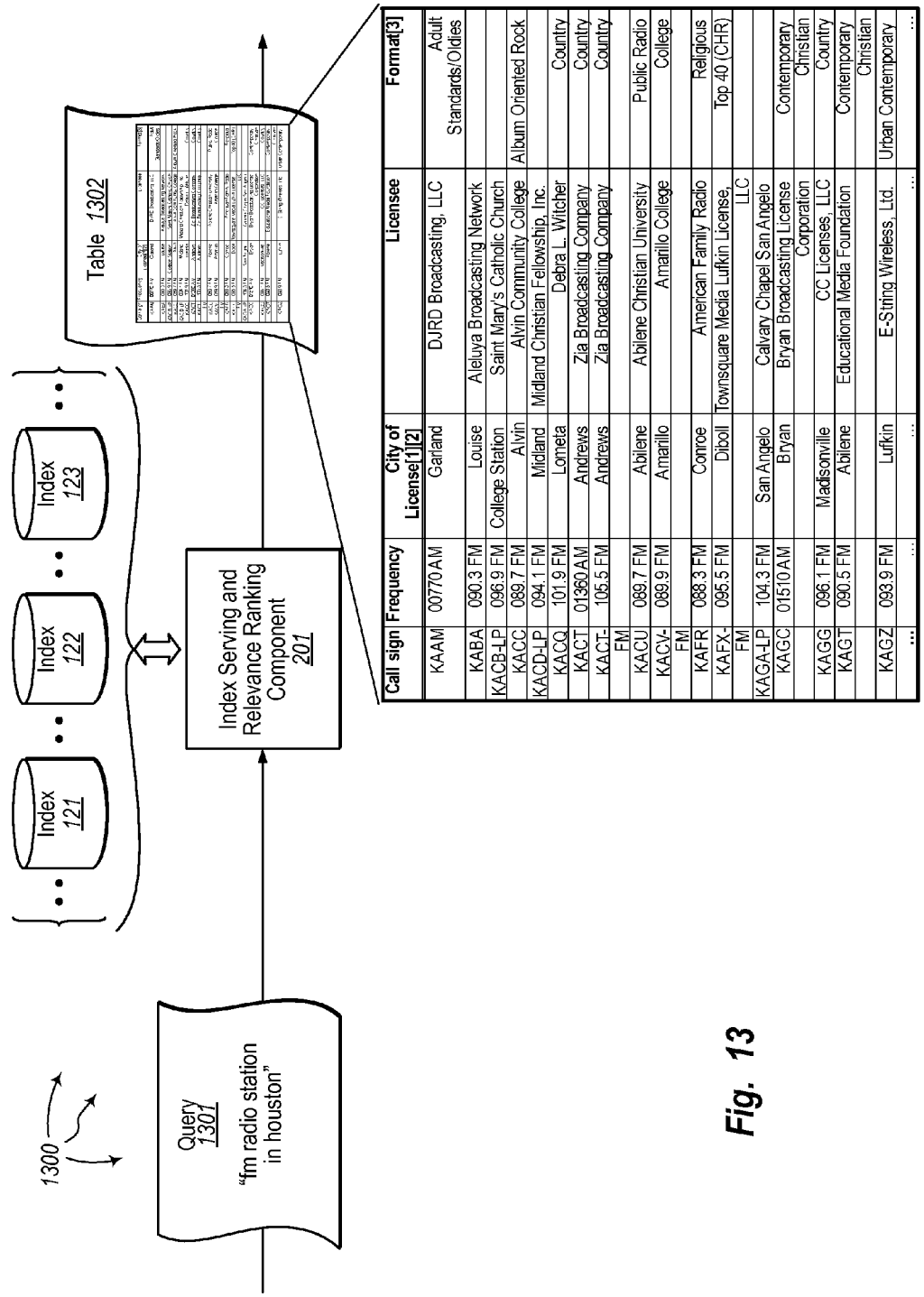
FIG. 13 illustrates an example computer architecture for returning a table matching a concept-filter query.

FIG. 13 illustrates an example computer architecture 1300 for returning a table matching a concept-filter query. As depicted in computer architecture 1300. Index serving and relevance ranking component 201 is connected to indexes 121, 122, 123, etc. Query 1301 "fm radio stations in houston" is received at table ranking component 201.

The intent of query 1301 is to get the list of FM radio stations in Houston. Index serving and relevance ranking component 201 can determine that table 1302 is an appropriate (and possibly very good) match for query 1301. Table 1302 is a list of radio stations in Texas. Index serving and relevance ranking component 201 can match 'radio stations' with the page title and 'FM' and 'Houston' against the values in the attribute (i.e., non-subject) columns Granularity of Feature Determination and Ranking Features can be determined for portions of table at any granularity, including cell and individual dimension (e.g., row or column). Rows and columns can be viewed interchangeably, since a table can be rotated 90 degrees to transition columns to rows and rows to columns Features can also be used for ranking at any granularity. If a table has a particularly popular and/trustworthy dimension (e.g., row or column), index serving and relevance ranking components 201 can use features to rank the dimension higher than other similar dimensions at other tables (even if the table containing the dimension is otherwise less popular and/or less trustworthy). Similarly, if a table has a particularly popular/trustworthy cell, index serving and relevance ranking components 201 can use features to rank the cell higher than other similar cells at other tables (even if the dimension and/or table containing the cell is otherwise less popular and/or less trustworthy).

More popular and/or trustworthy cells and dimensions can be ranked higher in search results. Search results can be presented at a granularity similar to features used to rank items returned in search results. For example, when a feature indicates that an individual dimension or cell of a table is more popular and/or more trustworthy, the individual dimension or cell can be presented higher in search results.

Other portions of a table or dimension can be omitted. For example, when a dimension is presented, other dimensions of a table can be omitted. When a cell is presented, other cells of a dimension can be omitted. Search results can include a link to omitted portions, for example, to a full dimension or full table.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system, the computer system comprising:
a hardware processor;
system memory coupled to the hardware processors, the system memory storing instructions that are executable by the hardware processor;
the hardware processor executing the instructions stored in the system memory to rank tables for inclusion in a response to a search query including one or more keywords, including the following:
  access a list of candidate tables for inclusion in the search query response, the list of candidate tables having been previously selected by having an approximate ranking score meeting a score threshold to be considered a candidate table;
  for each candidate table:
    generate a hit matrix for the candidate table, including for any of the one or more keywords contained in the candidate table, determining that one or more fields in one or more parts of the candidate table contain a hit for the keyword and, for each of the one or more fields, computing a location of the keyword hit within the field;
    access table features for the candidate table from a feature index;
    generate a hit matrix overlay for the candidate table by overlaying the hit matrix with the accessed table features to distinguish keyword hits in different semantic locations inside the candidate table, overlaying the hit matrix including mapping keyword hit locations into logical regions of the candidate table;
    compute one or more dynamic features of the candidate table from the hit matrix overlay; and
    generate a ranking score for the candidate table at least from the one or more dynamic features.

2. The computer system of claim 1, further comprising the hardware processor executing the instructions stored in the system memory to:
access one or more keywords of the search query;
compile a list of one or more hit tables that have any keyword hit, including for each keyword in the one or more keywords, referring to a table keyword index to identify any tables including the keyword;

compute an approximate ranking score for each hit table in the compiled list, the approximate ranking score for each hit table indicative of the sufficiency of the hit table as match to the search query; and formulate the list of candidate tables for further ranking by filtering out any hit tables from the compiled list having an approximate ranking score below the score threshold.

3. The computer system of claim 2, wherein the hardware processor executing the instructions stored in the system memory to compile a list of one or more hit tables that have any keyword hit comprises the hardware processor executing the instructions stored in the system memory to compile a list of one or more web tables.

4. The computer system of claim 2, wherein the hardware processor executing the instructions stored in the system memory to compute an approximate ranking score for each table in the compiled list comprises the hardware processor executing the instructions stored in the system memory to compute an approximate ranking score for each table in the compiled list by summing the inverse document frequencies for any keywords included in the table.

5. The computer system of claim 2, wherein the hardware processor executing the instructions stored in the system memory to compile a list of one or more hit tables that have any keyword hit comprises the hardware processor executing the instructions stored in the system memory to compile a list of one or more hit tables including at least one hit table that has a keyword hit in a hidden field.

6. The computer system of claim 1, further comprising for each candidate table the hardware processor executing the instructions stored in the system memory to:

access a set of static features for the candidate table; and derive a set of ranking features for the candidate table from the set of static features and the one or more dynamic features; and wherein the hardware processor executing the instructions stored in the system memory to generate a ranking score for the candidate table comprises the hardware processor executing the instructions stored in the system memory to generate a ranking score for the candidate table from the set of ranking features for the candidate table.

7. The computer system of claim 6, further comprising the hardware processor executing the instructions stored in the system memory to access a set of query features for the search query; and wherein the hardware processor executing the instructions stored in the system memory to derive a set of ranking features for the candidate table comprises the hardware processor executing the instructions stored in the system memory to derive the set of ranking features from the set of static features, the one or more dynamic features, and the set of query features.

8. The computer system of claim 7, wherein the hardware processor executing the instructions stored in the system memory to access a set of query features for the search query comprises the hardware processor executing the instructions stored in the system memory to:

for one or more keywords of the search query, access a translation model for the keyword; and access at least one other query feature selected from among: an indication if the keyword is a stop word, an indication if the keyword is numeric, and an indication if the keyword is alphanumeric.

9. The computer system of claim 6, wherein the hardware processor executing the instructions stored in the system memory to access a set of static features comprises the hardware processor executing the instructions stored in the system memory to access one or more of: a static rank of a web page containing the candidate table, a domain rank of the web page containing the candidate table, a click count of the web page containing the candidate table, a subject column index, number of rows in the candidate table, or a data type for each column of the candidate table.

10. The computer system of claim 6, wherein the hardware processor executing the instructions stored in the system memory to derive a set of ranking features for the candidate table comprises the hardware processor executing the instructions stored in the system memory to:

determine how many subject column values have keyword hits; and for each subject column value that has a keyword hit, determine how much the subject column value overlaps with the keyword hit.

11. The computer system of claim 6, wherein the hardware processor executing the instructions stored in the system memory to derive a set of ranking features comprises the hardware processor executing the instructions stored in the system memory to:

determine how many attribute column values have keyword hits; and for each attribute column value that has a keyword hit, determine an overlap ratio of how much the attribute column value overlaps with the keyword hit.

12. The computer system of claim 6, wherein the hardware processor executing the instructions stored in the system memory to derive a set of ranking features comprises the hardware processor executing the instructions stored in the system memory to:

determine which portions of the candidate table description, including one or more of: caption, Uniform Resource Locator (URL), title, page level heading, other headings, or surrounding text, include keyword hits; and compute a base score for the candidate table based on which portions of the candidate table description include keyword hits.

13. The computer system of claim 1, wherein the hardware processor executing the instructions stored in the system memory to compute one or more dynamic features comprises the hardware processor executing the instructions stored in the system memory to distinguish keyword hits in different semantic locations of the candidate table selected from among: subject column name, subject column values, attribute column names, attribute column values, or a table caption.

14. The computer system of claim 1, wherein the hardware processor executing the instructions stored in the system memory to generate a hit matrix overlay for the candidate table comprises the hardware processor executing the instructions stored in the system memory to generate a spatial hit pattern overlay for the candidate table.

15. The computer system of claim 1, wherein the hardware processor executing the instructions stored in the system memory to access a list of candidate tables for inclusion in the search query response comprises the hardware processor executing the instructions stored in the system memory to access a list of web tables.

16. The computer system of claim 1, wherein the hardware processor executing the instructions stored in the system memory to generate a hit matrix for the candidate table comprises the hardware processor executing the instructions stored in the system memory to determine that one or more of: a column name of the candidate table, a subject column of the candidate table, or a non-subject column of the candidate table contain a hit for the keyword.

17. The computer system of claim 1, wherein the hardware processor executing the instructions stored in the system memory to generate a hit matrix for the candidate table comprises the hardware processor executing the instructions stored in the system memory to determine that a hidden field contains a hit for the keyword, the hidden field selected from among a clicked query and anchor text.

18. The computer system of claim 1, wherein the hardware processor executing the instructions stored in the system memory to generate a hit matrix overlay for the candidate table comprises the hardware processor executing the instructions stored in the system memory to map keyword hit locations to one or more of: a table description, a column name, an entity column, or a cell of the candidate table.

19. At a computer system, a method for ranking tables for inclusion in a response to a search query including one or more keywords, the method comprising:
 accessing a list of candidate tables for inclusion in a search query response, the list of candidate tables having been previously filtered from a compiled list of tables, each candidate table filtered by having an approximate ranking score meeting a score threshold to be considered a candidate table;
 for each candidate table:
  generating a hit matrix for the candidate table, including for any of the one or more keywords contained in the candidate table: determining that one or more fields in one or more parts of the candidate table contain a hit for the keyword and, for each of the one or more fields, computing a location of the keyword hit within the field;
  accessing table features for the candidate table from a feature index;
  generating a hit matrix overlay for the candidate table by overlaying the hit matrix with the accessed table features to distinguish keyword hits in different semantic locations inside the candidate table, overlaying the hit matrix including mapping keyword hit locations into logical regions of the candidate table;
  computing one or more dynamic features of the candidate table from the hit matrix overlay; and
  generating a ranking score for the candidate table at least from the one or more dynamic features.

20. The method of claim 19, wherein accessing a list of tables that are candidate tables for inclusion in a search query response comprises accessing a list of web tables.

21. The method of claim 19, wherein determining that one or more fields in one or more parts of the candidate table contain a hit for the keyword comprises determining that one or more of: a column name of the candidate table, a subject column of the candidate table, or a non-subject column of the candidate table contain a hit for the keyword.

22. The method of claim 19, wherein determining that one or more fields in one or more parts of the candidate table contain a hit for the keyword comprises determining that one or more of: a page title of the candidate table, a table caption of the candidate table, a heading of the candidate table, and surrounding text associated with the candidate table contain a hit for the keyword.

23. The method of claim 19, wherein determining that one or more fields in one or more parts of the candidate table contain a hit for the keyword determining that a hidden field contains a hit for the keyword, the hidden filed selected from among a clicked query and anchor text.

24. The method of claim 19, wherein overlaying the hit matrix comprises overlaying the hit matrix with a spatial hit pattern overlay.

25. The method of claim 19, wherein mapping keyword hit locations to logical regions of the candidate table comprises mapping keyword hit locations to one or more of: a table description, a column name, an entity column, and a cell.

26. The method of claim 19, further comprising:
 accessing one or more keywords of the search query;
 compiling a list of one or more hit tables that have any keyword hit, including for each keyword in the one or more keywords, referring to a table keyword index to identify any tables including the keyword;
 computing an approximate ranking score for each hit table in the compiled list, the approximate ranking score for each hit table indicative of the sufficiency of the hit table as match to the search query; and
 formulating the list of candidate tables for further ranking by filtering out any hit tables from the compiled list having an approximate ranking score below the score threshold.

27. The method of claim 26, wherein compiling a list of one or more hit tables that have any keyword hit comprises compiling a list of one or more web tables.

28. The method of claim 26, wherein computing an approximate ranking score for each table in the compiled list comprises computing an approximate ranking score for each table in the compiled list by summing the inverse document frequencies for any keywords included in the table.

29. The method of claim 26, wherein compiling a list of one or more hit tables that have any keyword hit comprises compiling a list of one or more hit tables including at least one hit table that has a keyword hit in a hidden field.

30. The method of claim 19, further comprising for each candidate table:
 accessing a set of static features for the candidate table; and
 deriving a set of ranking features for the candidate table from the set of static features and the one or more dynamic features; and
 wherein generating a ranking score for the candidate table comprises generating a ranking score for the candidate table from the set of ranking features for the candidate table.

31. The method of claim 30, further comprising accessing a set of query features for the search query; and
 wherein deriving a set of ranking features for the candidate table comprises deriving the set of ranking features from the set of static features, the one or more dynamic features, and the set of query features.

32. The method of claim 31, wherein accessing a set of query features for the search query comprises:
 for one or more keywords of the search query, accessing a translation model for the keyword; and
 accessing at least one other query feature selected from among: an indication if the keyword is a stop word, an indication if the keyword is numeric, and an indication if the keyword is alphanumeric.

33. The method of claim 30, wherein accessing a set of static features comprises accessing one or more of: a static rank of a web page containing the candidate table, a domain rank of the web page containing the candidate table, a click count of the web page containing the candidate table, a subject column index, number of rows in the candidate table, or a data type for each column of the candidate table.

34. The method of claim 30, wherein deriving a set of ranking features for the candidate table comprises:
  determining how many subject column values have keyword hits; and
  for each subject column value that has a keyword hit, determining how much the subject column value overlaps with the keyword hit.

35. The method of claim 30, wherein deriving a set of ranking features comprises:
  determining how many attribute column values have keyword hits; and
  for each attribute column value that has a keyword hit, determining an overlap ratio of how much the attribute column value overlaps with the keyword hit.

36. The method of claim 30, wherein deriving a set of ranking features comprises:
  determining which portions of the candidate table description, including one or more of: caption, Uniform Resource Locator (URL), title, page level heading, other headings, or surrounding text, include keyword hits; and
  computing a base score for the candidate table based on which portions of the candidate table description include keyword hits.

37. The method of claim 19, wherein computing one or more dynamic features comprises distinguishing keyword hits in different semantic locations of the candidate table selected from among: subject column name, subject column values, attribute column names, attribute column values, or a table caption.

38. The method of claim 19, wherein generating a hit matrix overlay for the candidate table comprises generating a spatial hit pattern overlay for the candidate table.

* * * * *